(12) United States Patent
Lackner et al.

(10) Patent No.: US 6,514,456 B1
(45) Date of Patent: Feb. 4, 2003

(54) CUTTING METAL ALLOY FOR SHAPING BY ELECTRICAL DISCHARGE MACHINING METHODS

(75) Inventors: Andreas Lackner, Reutte (AT); Werner Ferstl, Reutte (AT); Gerhard Knünz, Lechaschau (AT); Hans-Peter Martinz, Hofen (AT); Klaus Prandini, Reutte (AT)

(73) Assignee: Plansee Tizit Aktiengesellschaft, Tirol (AT)

( * ) Notice: Subject to any disclaimer, the term of this patent is extended or adjusted under 35 U.S.C. 154(b) by 0 days.

(21) Appl. No.: 09/684,276

(22) Filed: Oct. 6, 2000

(30) Foreign Application Priority Data

Oct. 12, 1999 (AT) .............................. 699/99 U

(51) Int. Cl.$^7$ .............................................. C22C 27/04
(52) U.S. Cl. .......................... 420/431; 420/432; 148/423
(58) Field of Search ................... 420/431, 432; 148/423

(56) References Cited

U.S. PATENT DOCUMENTS 5,603,075 A * 2/1997 Stoll et al. .................. 428/548

FOREIGN PATENT DOCUMENTS

DE 27 19 532 A * 11/1977

* cited by examiner

Primary Examiner—John Sheehan
Assistant Examiner—Andrew L. Oltmans
(74) Attorney, Agent, or Firm—Morgan & Finnegan, L.L.P.

(57) ABSTRACT

The invention concerns the use of a WC—Co cutting metal alloy for a component or a tool insert, which is shaped from a corresponding cutting metal blank by means of an electrical discharge processing method. The WC fraction in the carbide phase of the cutting metal alloy is more than 90 wt %; the binder phase consists mostly of cobalt and is 8 to 15 wt % with reference to the cutting metal alloy. 0.1 to 3 wt % of one or more metals from the group Re, Ge, Ga, Ir, Os, Pd, Ag, Au, Pt, Te, Sb, Rh, and Ru, with reference to the binder phase, are dissolved in the binder phase.

11 Claims, 1 Drawing Sheet

CUTTING METAL ALLOY FOR SHAPING BY ELECTRICAL DISCHARGE MACHINING METHODS

BACKGROUND OF THE INVENTION

The present invention concerns the use of a tungsten-cobalt cutting metal alloys as components shaped from cutting metal blanks by means of electrical discharge machining methods. These alloys can be used for cutting and punching tools having a complex configuration, which are shaped by wire eroding or cavity sinking.

A large number of different cutting metal types, used, e.g. as dies in machining tools, are being employed to an increasing extent as materials for wear-resistant components or structural parts, for example, in the manufacture of tools.

The cutting or shaping of workpieces by electrical discharge machining was developed in the 50s for the processing of steel materials and is used today, more and more, for the shaping of workpieces made of cutting metal. The production of geometrically complex molded articles by electrical discharge machining methods is clearly more economical, for comparable quality, than the usual compression molding and the subsequent metal cutting.

The "electrical discharge machining of a workpiece" is understood to mean its shaping under the explosive evaporation of material parts from the surface of the workpiece, caused by local heating as a result of electrical current pulses with a plasma formation between the workpiece and the electrical discharge machining tool in a liquid dielectric—usually water or organic substances, such as petroleum or kerosene. To this end, an electric capacitor is charged and is discharged upon reaching the disruptive voltage between the workpiece and the tool as a short-term, high current pulse, with the formation of a plasma (T>10,000 K) in the dielectric. In actual practice, cavity sinking and wire eroding or erosive cutting have proven particularly effective. With cavity sinking, the tool or the eroding electrode can have the negative shape of the workpiece configuration. In accordance with the cutting process, the electrode is lowered onto the workpiece. With wire eroding, a wire electrode, usually having a diameter of 0.05 mm to 0.3 mm, is conducted past a path on the tool, which corresponds to the workpiece profile.

Whereas with the process of cavity sinking, erosion performance during roughing is between 20 $mm^3$/min and 50 $mm^3$/min and with planing, up to 1 $mm^3$/min, it is possible to attain roughing performances with wire eroding of 200 $mm^3$/min to 500 $mm^3$/min and with planing, approximately 10 $mm^3$/min. The surface roughness $R_a$ has a value of ca. 1.4 m with planing by means of cavity sinking; with wire eroding, it is ca. 0.2 $\mu$m in the most favorable case. Thus, eroded workpiece surfaces, as a rule, do not require mechanical surface processing.

Cutting metals are generally parts having a hard material phase embedded in a metal binder phase. The large number of known, different cutting metal alloys have very different, frequently mutually exclusive characteristics. Cutting metal types with a nickel binder, sometimes with a chromium additive, are more corrosion-resistant than those with cobalt binders. However, the former, as a rule, have a lower degree of hardness and as a result, lower abrasive wear and toughness characteristics. The actual characteristic values differ, in turn, with the particle or grain size in the cutting metal, which, in turn, encounter grain growth during the cutting metal sintering process. Hard materials, with different compositions and based on carbide and/or carbonitride, in connection with a large number of additives to the binding phases on a cobalt and/or nickel basis, are known for influencing or control of these characteristics.

Of the previously described cutting metal types, based on WC—Co or with predominantly Co binders, the following are mentioned in considering this invention.

DE 27 19 532 (Auslegeschrift) mentions a WC—Co cutting metal type with 20 to 95 wt % tungsten carbide and the added carbides TiC, TaC, NbC, HfC, VC, and/or $MO_2C$ and 2 to 30 wt % of a cobalt-rhenium binder alloy with a 5 to 80 wt % rhenium fraction. The cobalt can be replaced, in part, by iron or nickel. Whereas hitherto known additives to the cobalt binder reacted with the carbide phase, with the formation of brittle, complex carbides and thus compensated negatively for any quality improvement of the binder phase, this limitation does not apply to the cobalt-rhenium binder. In contrast to the pure cobalt binder, the binder has a higher heat resistance, which, for example, is advantageous to a cutting insert during metal cutting encountering working temperatures up to 800° at the cutting tip.

The technical essay "Sintering of WC—10Co Hard Metals containing Vanadium, Carbonitride and Rhenium;" authors: R. Hulyal et al., which appeared in "Int. J. Refr. Metals and Hard Materials," (1991), Vol. 10(1), pages 9 to 13, mentions the addition of 0.2 wt % rhenium into WC—10Co and WC/V(C,N)—10Co and the "Re effect" is described with the attaining of higher hardness values in a WC-rich cutting metal.

The SU patent, Application No. 91/4952086, describes a WC—Co cutting metal alloy for advantageous utilization as an electrode in ultrasound-microwelding tools because of the advantage of a great work stability. The alloy consists of 0.1 to 3 wt % rhenium, 0.15 to 3.85 wt % cobalt, 0.05 to 2 wt % chromium carbide, with the remainder, tungsten carbide.

To now, cutting metal components or tool inserts were typically manufactured by means of electrical discharge processing methods for applications in which it was important to have a high impact resistance and a resistance to abrasive wear. For example, for tool inserts for cutting and punching tools, tungsten carbide-cobalt cutting metal types, such as the ISO types K30 and K40, having a standard grain size of 1–2 $\mu$m, were usually used. In the carbide phase, the type K40 also contains, in addition to WC, <1 wt % TiC+Ta(Nb)C and 12 wt % cobalt as the binding phase, with reference to the total material. Occasionally cutting metal having nickel fractions in the cobalt binder are also used.

Cutting metals of WC—Co, used to now for shaping by means of electrical discharge processing, exhibit, as a serious disadvantage, a phenomenon, which is frequently designated in technical circles as "pitting"—that is, holes with a depth of up to 20 $\mu$m appear in the workpiece surface in components manufactured by means of erosion, with a probability of approximately 1 to 5% in statistically irregular individual cases. The reason for this is the dissolution of binder material (cobalt) from the workpiece surface during the erosion process in the area of these holes. The reason is apparently an electrochemical corrosion process between the individual phase components of a cutting metal alloy with the dielectric of the eroding unit. This corrosive dissolution process can be the direct consequence of an insufficient rinsing of the cutting gap between the workpiece and the eroding electrode with the liquid dielectric, which brings about an increase in the electrical conductance there, or an excessively high conductance of the dielectric. Frequently, the cobalt dissolution cannot be seen without a microscope, since the surface appears to be in an optically satisfactory condition prior to removal of the carbide phase. Remarkably, pitting occasionally appears on a part of a workpiece surface which is not directly eroded, apparently as a result of the increase in the conductance in the entire dielectric.

A local increase in conductance at the cutting point is counteracted, in actual practice, by a continuous, local replacement of dielectric by means of active rinsing of the cutting gap. With complex-dimensioned cutting profiles and with demanding manufacturing parameters, however, a sufficient rinsing of the cutting gap cannot be ensured up to now and "pitting" can, therefore, not be ruled out. Rather, the known countermeasures are limited to the publication of "Points of departure for solving the problem of pitting," such as: "Note, constantly, the conductance of the dielectric and maintain smaller than 5 $\mu$m S/cm" or "Interrupt the processing or do not start it at all, if the aforementioned conductance can be maintained only with a lot of effort." The practical result is an unsatisfactory number of rejects of eroded cutting metal workpieces.

OBJECT OF THE INVENTION

Accordingly, it is an object of the present invention to provide a cutting metal alloy which is manufactured, as before, on a WC—Co basis because of the severe requirements for the combination of abrasive wear resistance, toughness, and hardness, and which is more suitable for electrical discharge processing than the WC—Co cutting metal types used to now.

The cutting metal types should be, in particular, less susceptible to "pitting" and should not be inferior to hitherto used types with regard to toughness and abrasive wear. This goal is attained, in accordance with the invention, by the use of a WC—Co cutting metal alloy for components or tool inserts which are shaped by means of electrical discharge processing methods, wherein the alloy encompasses a carbide phase having >90 wt % WC fraction in the carbide phase, and, with reference to the cutting metal alloy, having 8 to 15 wt % of a binder phase in which a metal additive is completely dissolved, wherein this additive is present in a fraction of 0.1 to 3 wt %, with reference to the binder phase, and comprises at least one metal from the group Re, Ge, Ga, Ir, Os, Pd, Ag, Au, Pt, Te, Sb, Rh, and Ru.

DETAILED DESCRIPTION OF THE INVENTION

Figure 1:
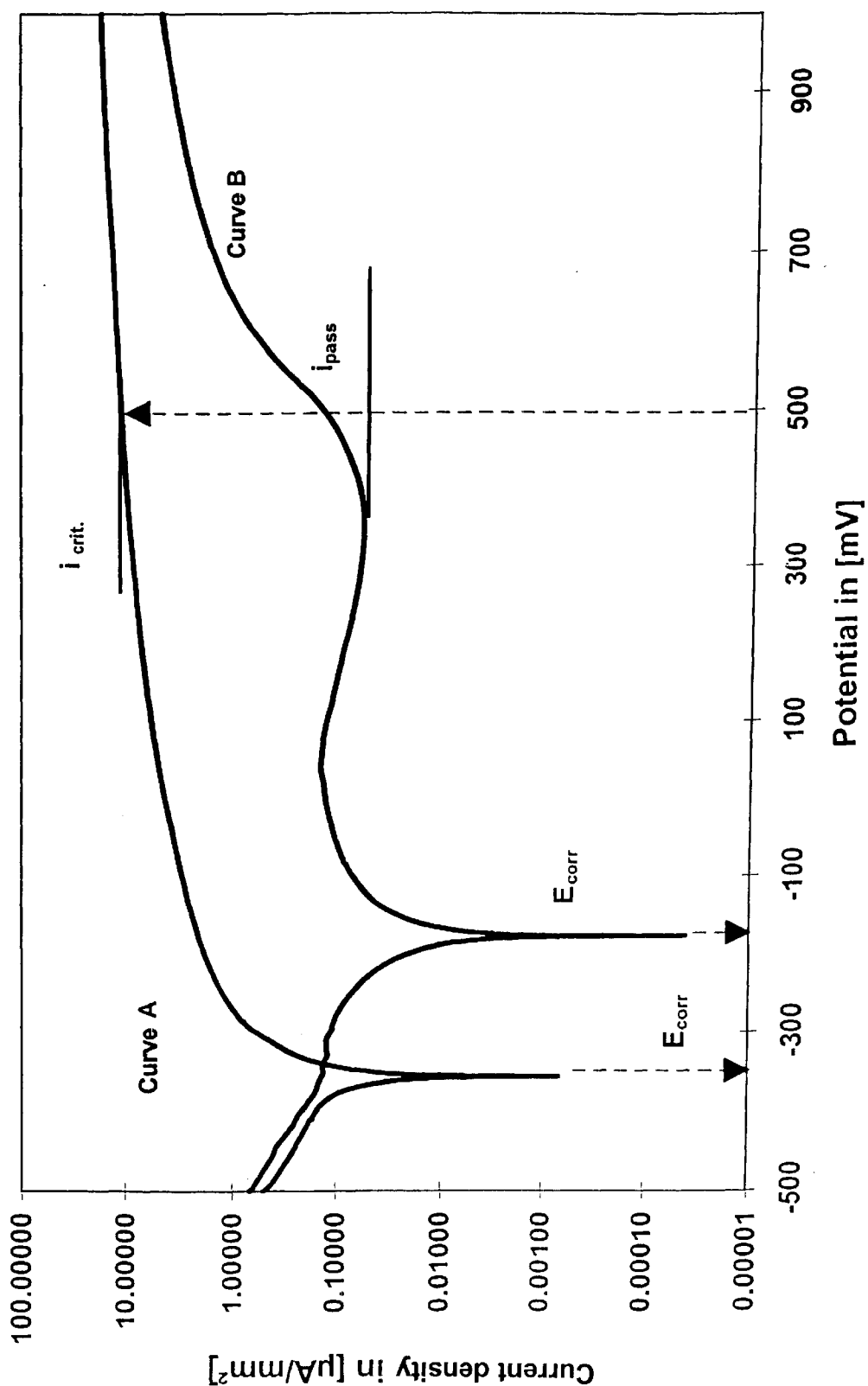
FIG. 1 is a set of potentiodynamic current density-potential measurment curves for cutting metals.

The WC—Co cutting metal alloy used in accordance with the invention contains greater than 90% WC in the carbide phase and, in the hard material or carbide phase optionally, TaC, TiC, NbC, HfC, VC, and/or $Mo_2C$ and also mixed carbides, in particular (TaNb)C. Carbonitrides or pure nitrides, as they are used in cermets, are not used as a hard material.

In the cutting metal alloy in accordance with the invention, pure cobalt, plus an added metal, is used as the binder phase; alternately and rather in special cases, cobalt exhibiting the greatest weight fraction in the binder is replaced by <50 wt % nickel, based on the weight of the binder. As mentioned previously, Ni fractions improve the corrosion characteristics of the cutting metal, but at the same time reduce the abrasive, wear, and toughness characteristics. Larger fractions of Ni in the cobalt binder phase are thus tolerable, in accordance with the invention, only with components in which comparatively lower mechanical characteristic requirements are present.

The additives to the cobalt binder phase in accordance with the cutting metal used in the invention are to be completely and homogeneously dissolved in the binder. The deposition of additives even fractionally, as a discrete phase, for example, as small phase regions, on the grain boundaries between the carbide and binder phases, should be avoided. The quantitative upper limit of the binder additives is, accordingly, to be adapted to the individual alloy composition, and optionally, to be tested on a manufacturing sample by means of microprobe analysis or transmission electron microscopy.

The aforementioned metal additives to the binder are advantageously admixed, in powder form, in the cutting metal powder batch before compression and sintering, either as a metal component or, with regard to the chromium additive, also in the form of a chromium carbide, which decomposes during the cutting metal sintering with a complete dissolution of the metal in the cobalt binder phase. The influence of the metal additives and of nickel, chromium, and copper to the binder on the mechanical and physical cutting metal characteristics is known and was, in part, briefly discussed in the state of the art. The influence of the metal additives is not important, however, because of the small quantities actually added according to this invention. Thus, for the metal additives to the binder, which are cited in the cutting metal alloys in accordance with the invention, it is desired that the toughness and wear resistance characteristics are not disadvantageously changed, in comparison to those of the pure WC—Co cutting metal. For the selection of the binder additives, according to type and quantity, complete solubility in the cobalt binder is desired, but also the advantageous shift of the electrochemical corrosion potential of the binder and the carbide phase with respect to one another is also necessary. The binder phases in accordance with the invention produce a convergence of their electrochemical potentials, determined by means of measurement technology, to that of the WC carbide phase. The potential convergence results in that in practice tests—even under the most difficult process conditions—"pitting" is not determined during the shaping of the raw cutting metal due to the electrical discharge machining method, and the "pitting" can accordingly be regarded as having been overcome in practical cases of application.

To now, importance has not been given to the electrochemical potentials of the carbide and binder phases in the cutting metal, and they were not given special consideration or determined in the development of cutting metal types. There were also no indications to now that, by adapting the electrochemical potentials of the carbide and binder phases, the appearance of pitting during the shaping of the cutting metal by means of electrical discharge processing could be effectively avoided.

Thus, there has been no reason for the cutting metal specialist, to now, to recommend the cutting metal alloys, mentioned in accordance with the invention, for processing by wire eroding or cavity sinking as particularly suitable.

Rather, it was completely surprising for the specialist that the cobalt binder known as being susceptible to corrosion could be improved by comparatively low additions of the aforementioned metals added in solution, with regard to "pitting" susceptibility during the erosion process, to the extent which is actually attained, without producing the recognizable disadvantages with regard to mechanical characteristics and thus, with regard to the service lives of corresponding tool inserts.

By means of those methods and devices familiar to the electrochemist and measurement results obtained with them, it is possible to note a quantitative convergence of the potentials of the carbide and binder phases upon addition of the additives, in accordance with the invention, to the binder and to establish them, with great reliability, as a measurable variable for the absence of the feared pitting.

The addition of copper to the binder takes place predominantly because of its corrosion resistance with respect to Cl ions, which can sometimes be contained in the dielectric.

The alloy used in accordance with the invention does not differ basically from other alloys in its production. No additional instructions for its production are necessary for the specialist. However, the comment is repeated that one must be careful during production that the binder additives are added in such maximum quantities that there is a complete solution of the additives in the cobalt binder, without deposition or formation of regions of pure added metal phases.

The production of the geometric contours of cutting metal components by means of electrical discharge machining is not limited to individual exemplified embodiments or application examples. One point of application is to be found in the electrical discharge processing of cutting metal unmachined parts for the wide application field of cutting and punching tools for the production of metal and nonmetal, predominantly film-like mass-produced parts with a frequently complex and filigree geometric shape.

The invention is described in more detail with the aid of the following examples, in which cutting metal samples with different chemical compositions are compared with those according to the state of the art.

The production of all cutting metal alloys mentioned in the following examples takes place according to known methods with the following essential method steps: the individual powder materials with grain sizes between 1 and <4 μm are ground in an attritor and mixed. The powder mixture is subsequently granulated according to the usual method and pressed to form samples or molded articles. The samples are dewaxed in a standard manner and sintered at a temperature between 1380 and 1420° C.

The physical and mechanical characteristics of the cutting metal alloys are close to one another with regard to hardness (HV30), residual porosity, and average WC grain size of 1.5 μm.

A key to the invention under consideration and its substantiation lies in determining the electrochemical potentials on cutting metal samples with different chemical and metallurgical structures—in each case, in comparison to a standard electrode (Ag/AgCl electrode)—and to draw conclusions therefrom for the corrosion resistance of the individual cutting metal alloy.

The potential measurements of all examples were carried out in a standard 3-electrode cell. Details on the electrochemical test method, in particular, in the use with cutting metals, can be found in the two technical essays: "The Relationship between Electrochemical Behaviour and Inservice Corrosion of WC-Based Cemented Carbides" by A. M. Human and H. Exner, published in the "International Journal of Refractory Metals and Hard Materials," Vol. 15 (1997), pages 65–71, or "Anodic Polarization and Corrosion of WC—Co Hard Metals," by W. J. Tomlinson and N. Y. Ayerst, published in the "Journal of Material Science," Vol. 24 (1989), pages 2348–2352."

The essential measurement values from these investigations are-the corrosion potential $E_{corr}$ for the cutting metal alloy, and the critical or the passivation current density $i_{crit}$ or $i_{pass}$, wherein $E_{corr}$ is a measure of the corrosion probability of the cutting metal in the dielectric of the eroding unit and wherein differences of the potential value for various cutting metal compositions permit a statement regarding better or worse corrosion resistance during the eroding process. The more positive the value of the corrosion potential $E_{corr}$, the lower is the susceptibility of the cutting metal type with respect to corrosion.

With potentials more positive than $E_{corr}$, corrosion appears in the cutting metal alloy—in the area of the binder phase, because this is basically more base, electrochemically, than the hard material phase (WC). The current densities $i_{crit}$ or $i_{pass}$ represent a type of limiting current density value between the cutting metal sample and a platinum counterelectrode at high potentials and are a measure of the metal dissolution rate (that is, corrosion) in the binder phase.

For these so-called potentiodynamic current density-potential measurements of all cutting metal types used in the following examples, cutting metal samples with a size of ca. 0.5×0.5×1 cm were ground and polished. The experiments were carried out in acetic acid solution (12 g/L)/model solution as a dielectric. The experimental temperature was 30 ∀1° C. The samples were polarized at 800 mV for 10 minutes, subsequently stabilized for 30 minutes, and finally connected against a platinum electrode with a positive scan rate of 0.3 mV/s between the end values −500 and +1000 mV polarization voltage.

The relationship produced from potentiodynamic current density-potential measurements (current amount, with reference to sample surface), as a function of the potential adjacent to the cutting metal sample in each case, is shown in FIG. 1, below. For cutting metal alloys, 2 different potential/current density paths are characteristic in accordance with FIG. 1 (type A or Type B curve). In the characteristic type A curve, the cutting metal sample exhibits a steep current density decline with a characteristic potential $E_{corr}$ and then approximates a maximum limiting current density with high potential values. In accordance with the definition, the current density produced there is designated as $i_{crit}$ with a potential of 500 mV. Alternate to curve A, the curve path of curve B for the potential-current density relationship is characteristic of a large number of cutting metal types. Once again, a characteristic potential $E_{corr}$ appears and furthermore, a typical current density minimum appears with higher potentials, which is designated as $i_{pass}$ and can be explained as a consequence of typical passivation reactions of individual components of the cutting metal alloy.

EXAMPLE 1

Composition of the powder batch for the production of the cutting metal alloy in accordance with the invention: 12 wt % Co; 0.1 wt % Pd; 0.2 wt % TiC; 0.4 wt % Ta/NbC; remainder WC; (wt %, with reference to the weighed components).

An investigation of the above sintered cutting metal samples by means of an electron beam microprobe revealed that the palladium added to the powder mixture is completely dissolved in the Co binder.

The electrochemical current density potential measurement produced the following:

Curve type: "A"

$E_{corr}(mV)=-300$ $i_{crit}(\mu m/mm^2)$ [sic; $(\mu A/mm^2)$]=7.078

As a comparison with the cutting metal alloy in accordance with the invention, a standardized type K40 was used, which has usually been available up to now for components or tool inserts, shaped by electrical discharge machining.

The electrochemical current density potential measurement produced the following:

Curve type A $E_{corr}(mV)=-360$ $i_{crit}(\mu A/mm^2)=8.08$

In accordance with the preceding statements, a comparison of the measurement values permits the statement that the sample with the composition in accordance with the invention is clearly less susceptible to corrosion than the comparison sample.

It was possible to process the cutting metal types K40 and the alloy in accordance with Example 1, which are comparable in their mechanical characteristics, by means of electrical discharge machining methods to make inserts for punching tools with comparably good quality. A subsequent comparison test of the two cutting metal types in a typical fabrication for the production of punched plate-like profile parts from magnetic steel sheets produced comparably good cutting quality and comparably good tool service lives for the two types.

Whereas, however, in the manufacturing of punching tools from the cutting metal type K40 in series, by means of electrical discharge machining methods, approximately 5% of the tools manufactured in that manner are eliminated because of nontolerable corrosion; no corrosion phenomena and no corrosion rejects were found in the production of a small series of punching tools using the cutting metal type of Example 1.

EXAMPLE 2

The powder batch had the following composition in accordance with the invention: 12 wt % Co; 0.1 wt % Ge; 0.2 wt % TiC; 0.4 [wt %] Ta/NbC; remainder WC.

The production process for the fabrication of the cutting metal sample and the physical-mechanical characteristics determined on the sample corresponded to those of Example 1 and at the same time, to those of the ISO type K40. The electrochemical corrosion studies were carried out as described before Example 1.

The following values were produced:

Curve type: "A"

$E_{corr}(mV)=-288$ $i_{crit}(\mu A/mm^2)=8.021$

A comparison with the standard type K40 showed that the cutting metal according to this example also exhibited clearly more favorable corrosion values and notwithstanding, produced comparably good cutting results and service lives for punching tools produced by means of electrical discharge machining methods.

EXAMPLE 3

Example 3 was used for the determination of $E_{corr}$, $I_{pass}$ characteristics for a cutting metal type which differs from the standard K40 in that chromium was added to it, which suddenly makes this cutting metal alloy more corrosion-resistant, in comparison to a pure K40.

The powder composition used was, accordingly, the following: 12 wt % Co, 0.8 wt % $Cr_3C_2$, remainder WC.

The characteristics thus obtained were used as a reference for Examples 4–7 below, in accordance with the invention, in which components essential to the invention were also added to a powder batch analogous to this Example 3.

By means of a microprobe measurement, it was determined that the $Cr_3C_2$ added to the powder batch had decomposed during the sintering and that the Cr fractions were completely dissolved in the Co binding phase.

The electrochemical investigations corresponded to the description given above and produced the following:

Curve type: "B"

$E_{corr}(mV)=-247$ $i_{pass}(\mu A/mm^2)=2.93$

EXAMPLE 4

The powder selection and cutting metal production were carried out as described before Example 1; the chemical composition of the powder batch was as follows: 12% Co; 0.8% $Cr_3C_2$; 500 wt-ppm Re; remainder WC.

The physical and mechanical characteristics agreed with those according to Example 1.

With the electrochemical current density potential measurement (carried out as described before Example 1), the following results were obtained:

Curve type B $E_{corr}(mV)=-196.7$ $i_{pass}(\mu A/mm^2)=0.0461$

The addition of Re to an otherwise standard powder batch according to Example 3 brought about a sudden improvement in the coefficients $E_{corr}$ and $i_{pass}$, in comparison to the values determined there.

From two sintered cutting metal blocks (dimensions: 150×80×45 mm), 40 punching rams for a rotor-stator tool were produced to finished dimensions, without any signs of a corrosive attack—under standard conditions specified by the unit manufacturer for an "AGIE Evolution" wire cutting machine (manufacturer: AGE Company, Switzerland). These rams were installed in a punching tool for the manufacture of sheet metal for motors (sheet metal quality DIN M400-50A, apparent limit of elasticity, ca. 320 N/mm², tensile strength, ca 460 N/mm², elongation at break, ca. 25%, chemical composition: C: 0.07 wt %, Si<2.5%).

With a Bruderer punching unit (manufacturer: Bruderer Company, Switzerland) and a pressing force of 100 tons, a total of 5.2 million strokes, with number of strokes at ca. 400 strokes per minute, were attained with this tool without regrinding. Resharpening was undertaken because of increased wear on the cutting edge, which manifested itself in the form of a burr on the workpiece. In comparison to this, a total of 4.1 million strokes were attained in the same punching work with a tool shaped by electrical discharge machining, made of the known cutting metal type K40; a total of 4.5 million strokes, without regrinding the tool, were attained with the known comparison type in accordance with Example 3.

EXAMPLE 5

The powder selection and cutting metal production were carried out as described before Example 1; the chemical composition of the powder batch was as follows: 12% Co; 1.15% $Cr_3C_2$; 500 ppm Re; remainder WC.

The physical and mechanical characteristics corresponded approximately to those of Examples 1 and 3.

With the electrochemical current density potential measurement (carried out as described before Example 1), the following results were produced:

Curve type: "B"

$E_{corr}(mV) = -118.3$ $i_{pass}(\mu A/mm^2) = 0.0246$

The $Cr_3C_2$ fraction in the powder batch, which was larger in comparison to Example 4, brought about the expected binder refining—that is, a comparably more positive value $E_{corr}$ and a smaller current density $i_{pass}$. This example also shows, at the same time, however, the desirability of the Re addition, in accordance with the invention, to the hitherto used standard alloys. The addition of Cr to the K40 type alone does not represent a satisfactory alternative to the solution in accordance with the invention.

EXAMPLE 6

Production and powder selection were carried out as before Example 1, with the following chemical composition of the powder batch: 11.5% Co; 0.8% $Cr_3C_2$; 0.5% Cu; 500 ppm Re; remainder WC.

In contrast to Example 4, the cutting metal alloy had a copper fraction completely dissolved in the binder.

The physical and mechanical characteristics corresponded approximately to those of Examples 1, 3, and 4.

With the electrochemical current density potential measurement (carried out as described before Example 1), the following results were produced:

Curve type: "B"

$E_{corr}(mV) = -178.1$ $i_{pass}(\mu A/mm^2) = 0.05875$

EXAMPLE 7

This inventive example differs from Example 4 due to the partial replacement of Co by Ni in the binder, wherein Co and Ni form a complete alloy. Cutting metal types with a Ni binder or Ni additive in the Co binder are known as more corrosion-resistant but less wear-resistant.

The production and powder selection were carried out as described before Example 1. The chemical composition of the powder batch was as follows: 7.6% Co; 4.4% Ni; 1.1% $Cr_3C_2$; 500 ppm Re; remainder WC.

In comparison to the examples cited above, this cutting metal alloy exhibited, as is known from the technical literature, clearly worse mechanical characteristics.

With the electrochemical current density potential measurement (carried out as described in Example 1), the following results were produced:

Curve type B $E_{corr}(mV) = -112.3$ $i_{pass}(\mu A/mm^2) = 0.029$

The corrosion resistance surpassed that of the pure WC—Co types with Re additive in accordance with the invention (Example 4). A comparison of values showed, however, that the decisive contribution to the increase in corrosion resistance, in comparison to the previously known WC—Co types (Example 3), can be attributed to the Re additive.

This is demonstrated by the following comparison with a WC—Co/Ni alloy without Re additive.

The chemical composition of the powder batch of the comparison sample was as follows:

7.6% Co; 4.4% Ni; 1.1% $Cr_3C_2$; remainder WC.

The physical and mechanical characteristics correspond to those of the sample, in accordance with the invention, according to this example.

With the electrochemical current density potential measurement (carried out as in Example 1), the following results were produced:

Curve type B $E_{corr}(mv) = -183.2$ $i_{pass}(\mu A/mm^2) = 0.0483$

What is claimed is:

1. A WC—Co cutting metal alloy having a carbide phase and a binder phase, wherein greater than 90% of the carbide phase is comprised of WC and wherein the binder phase is present at from 8 to 15 wt %, based on the total weight of the alloy, said binder phase being comprised of cobalt and having a metal additive dissolved therein, said metal additive being present in an amount of from 0.1 to 3 wt %, based on the weight of the binder phase, and said metal additive being selected from the group consisting of Re, Ge, Ga, Ir, Os, Pd, Ag, Au, Pt, Te, Sb, Rh, and Ru, said cutting metal alloy being suitable for use in components and adapted to be shaped by an electrical discharge processing method.

2. A cutting metal alloy according to claim 1 wherein the tool insert is a cutting and punching tool.

3. A cutting metal alloy according to claim 1 wherein said carbide phase also contains carbides or mixed carbides of the metals selected from the group consisting of Ta, Nb, Ti, Hf, V, and Mo.

4. A cutting metal alloy according to claim 1 wherein said binder phase contains less than 30 wt % Ni, based on the total weight of the binder phase.

5. A cutting metal alloy according to claim 1 wherein said binder phase is present in the cutting metal alloy at from 9 to 12 wt %, based on the total weight of the alloy.

6. A cutting metal alloy according to claim 1 wherein said metal additive is present in an amount of from 0.1 to 0.5 wt %, based on the weight of the binder phase.

7. A cutting metal alloy according to claim 1 wherein the metal additive in the binder is selected from a group consisting of Re, Ge, and Pd.

8. A cutting metal alloy according to claim 1 wherein the binder also contains a Cr and/or Cu additive.

9. A cutting metal alloy according to claim 8 wherein the chromium additive is added as a fine-grained $Cr_3C_2$ powder, in an amount above 0.1 wt %, based on the weight of the binder phase.

10. A cutting metal alloy according to claim 8 wherein the copper additive is added as a fine-grained powder in an amount up to 10 wt %, based on the total weight of the binder phase.

11. A cutting metal alloy according to claim 1 wherein said shaping by means of electrical discharge machining is a wire eroding or cavity sinking process in a liquid dielectric.

* * * * *